United States Patent
Yu et al.

(10) Patent No.: US 11,064,187 B2
(45) Date of Patent: Jul. 13, 2021

(54) DISPLAY MODULE, HEAD MOUNTED DISPLAY, AND IMAGE STEREOSCOPIC DISPLAY METHOD AND APPARATUS

(71) Applicant: TENCENT TECHNOLOGY (SHENZHEN) COMPANY LIMITED, Shenzhen (CN)

(72) Inventors: Zhixiong Yu, Shenzhen (CN); Mingtian Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 3 days.

(21) Appl. No.: 16/667,242

(22) Filed: Oct. 29, 2019

(65) Prior Publication Data
US 2020/0068191 A1    Feb. 27, 2020

Related U.S. Application Data

(63) Continuation of application No. PCT/CN2018/117429, filed on Nov. 26, 2018.

(30) Foreign Application Priority Data

Nov. 28, 2017   (CN) .......................... 201711217289.2

(51) Int. Cl.
*H04N 13/344* (2018.01)
*H04N 13/189* (2018.01)
(Continued)

(52) U.S. Cl.
CPC ....... *H04N 13/344* (2018.05); *G02B 27/0172* (2013.01); *G02B 27/0176* (2013.01);
(Continued)

(58) Field of Classification Search
CPC .. H04N 13/302; H04N 13/268; H04N 13/344; G02B 30/34; G02B 27/0961; G02B 27/0172; G02F 1/133377; G02F 1/133636
See application file for complete search history.

(56) References Cited

U.S. PATENT DOCUMENTS

| 5,825,456 A | 10/1998 | Tabata et al. |
| 8,705,177 B1 * | 4/2014 | Miao .................... H04N 13/395 |
| | | 359/630 |

(Continued)

FOREIGN PATENT DOCUMENTS

| CN | 101285938 A | 10/2008 |
| CN | 102466888 A | 5/2012 |

(Continued)

OTHER PUBLICATIONS

The World Intellectual Property Organization (WIPO) International Search Report for PCT/CN2018/117429 dated Feb. 25, 2019 6 Pages (including translation).

(Continued)

*Primary Examiner* — Clifford Hilaire
(74) *Attorney, Agent, or Firm* — Anova Law Group, PLLC

(57) ABSTRACT

Embodiments of this application disclose a display including a display screen, a liquid crystal lens layer, and a control module. The display screen comprises a plurality of pixel groups, each of which includes at least one pixel. The liquid crystal lens layer comprises a plurality of liquid crystal lens units, each pixel group being correspondingly disposed with a liquid crystal lens unit. The control module is configured to obtain virtual display depth information of to-be-displayed content of each pixel group. The control module is configured to control, when displaying the to-be-displayed content on a pixel group and according to the virtual display depth information, an electric field applied to a liquid crystal (Continued)

lens unit corresponding to the pixel group, to change a refractive index of the corresponding liquid crystal lens unit, and is configured to adjust a first virtual image of the content displayed by the pixel group.

19 Claims, 7 Drawing Sheets

(51) Int. Cl.
  *H04N 13/398* (2018.01)
  *G02B 30/27* (2020.01)
  *G02B 27/01* (2006.01)
  *H04N 13/30* (2018.01)
  *H04N 13/268* (2018.01)
  *H04N 13/271* (2018.01)

(52) U.S. Cl.
  CPC ........... *G02B 30/27* (2020.01); *H04N 13/189* (2018.05); *H04N 13/268* (2018.05); *H04N 13/271* (2018.05); *H04N 13/30* (2018.05); *H04N 13/398* (2018.05)

(56) References Cited

U.S. PATENT DOCUMENTS

| | | | | |
|---|---|---|---|---|
| 2003/0095092 | A1* | 5/2003 | Kume | G02F 1/13471 |
| | | | | 345/87 |
| 2008/0247670 | A1* | 10/2008 | Tam | H04N 13/257 |
| | | | | 382/298 |
| 2008/0252720 | A1 | 10/2008 | Kim et al. | |
| 2012/0105747 | A1 | 5/2012 | Biring | |
| 2016/0363781 | A1* | 12/2016 | Wu | G02B 30/36 |
| 2016/0370595 | A1 | 12/2016 | Sumi | |
| 2017/0038597 | A1 | 2/2017 | Li et al. | |
| 2017/0315348 | A1* | 11/2017 | Hayashi | G09G 3/36 |
| 2018/0120576 | A1 | 5/2018 | Gao et al. | |

FOREIGN PATENT DOCUMENTS

| | | |
|---|---|---|
| CN | 102854694 A | 1/2013 |
| CN | 101285938 B | 3/2013 |
| CN | 104360533 A | 2/2015 |
| CN | 204331219 U | 5/2015 |
| CN | 105093541 A | 11/2015 |
| CN | 105242405 A | 1/2016 |
| CN | 205562957 U | 9/2016 |
| CN | 106257322 A | 12/2016 |
| CN | 106291959 A | 1/2017 |
| CN | 107884940 A | 4/2018 |
| JP | H08313848 A | 11/1996 |
| KR | 20160050423 A | 5/2016 |
| TW | 201314267 A | 4/2013 |

OTHER PUBLICATIONS

The State Intellectual Property Office of the People's Republic of China (SIPO) Office Action 1 for 201711217289.2 dated Mar. 5, 2019 12 Pages (including translation).

The State Intellectual Property Office of the People's Republic of China (SIPO) Office Action 2 for 201711217289.2 dated Oct. 21, 2019 11 Pages (including translation).

* cited by examiner

DISPLAY MODULE, HEAD MOUNTED DISPLAY, AND IMAGE STEREOSCOPIC DISPLAY METHOD AND APPARATUS

RELATED APPLICATIONS

This application claims priority to PCT Application No. PCT/CN2018/117429, filed on Nov. 26, 2018, which in turn claims priority to Chinese Patent Application No. 201711217289.2, entitled "DISPLAY MODULE, HEAD MOUNTED DISPLAY, AND IMAGE STEREOSCOPIC DISPLAY METHOD," filed with the China National Intellectual Property Administration on Nov. 28, 2017. The two applications are incorporated by reference in their entirety.

FIELD OF THE TECHNOLOGY

This application relates to the field of image stereoscopic display technologies, and in particular, to a display module, a head mounted display, and an image stereoscopic display method and apparatus.

BACKGROUND OF THE DISCLOSURE

A head mounted display usually uses a structure including a lens and a screen, and places the screen within one focal length of the lens. The lens is between the screen and the user, so that a magnified virtual image on the screen is displayed for the user to view. Lenses that correspond to the user's left and right eyes may be spaced apart. Stereoscopic experience of the user in a virtual scene comes from a relative position change of corresponding points in the left and right eye images, thereby causing a change in the sight angle of both eyes to cause a near-far perception. However, in a head mount display, an image distance seen by human eyes is only a virtual image distance between a virtual image on the screen and the user, and the distance usually does not change as the image on the screen changes. Consequently, a distance of an image perceived by the user's brain is not in consistent with a distance feedback to the brain through the binocular lenses. After the head mounted display is used for a long time, the user may trigger a self-protection mechanism, that is, dizziness and discomfort. Therefore, the product service time is limited.

SUMMARY

Embodiments of this application provide a display module, a head mounted display, and an image stereoscopic display method and apparatus, to achieve superposition with the same visual range of a virtual object and a real object, so as to improve viewing experience of a user.

The embodiments of this application provide a display. The display includes a display screen, a liquid crystal lens layer, and a control module. The display screen comprises a plurality of pixel groups, and each pixel group comprising at least one pixel. The liquid crystal lens layer comprises a plurality of liquid crystal lens units, each pixel group being correspondingly disposed with a liquid crystal lens unit, and the liquid crystal lens unit comprising liquid crystal molecules. The control module is electrically coupled to the display screen and the liquid crystal lens layer, and is configured to obtain virtual display depth information of to-be-displayed content of each pixel group on the display screen, and is configured to control, when displaying the to-be-displayed content on a pixel group and according to the virtual display depth information, an electric field applied to a liquid crystal lens unit corresponding to the pixel group, to change a refractive index of the corresponding liquid crystal lens unit, and is configured to adjust, by using the corresponding liquid crystal lens unit, a first virtual image of the content displayed by the pixel group.

The embodiments of this application further provide a head mounted display, including the foregoing display.

The embodiments of this application further provide an image stereoscopic display method. The method includes obtaining a to-be-displayed image to be displayed on a display screen, the to-be-displayed image comprising a plurality of pixel regions; obtaining, in the to-be-displayed image, virtual display depth information corresponding to each of the pixel regions corresponding to a plurality of pixel groups on the display screen; controlling, when displaying the to-be-displayed image on the display screen and according to the virtual display depth information corresponding to each of the plurality of pixel regions, an electric field applied to a liquid crystal lens unit in a light emitting direction of the display screen and corresponding to a pixel group of a pixel region, to change a refractive index of the liquid crystal lens unit; and adjusting, by using the corresponding liquid crystal lens unit, a first virtual image of content displayed by the pixel group.

The embodiments of this application further provide an image stereoscopic display apparatus, including: a processor and a memory, the memory storing a computer program, and the computer program being loaded by the processor and performing the following operations: obtaining a to-be-displayed image to be displayed on a display screen, the to-be-displayed image comprising a plurality of pixel regions; obtaining, in the to-be-displayed image, virtual display depth information corresponding to each of the pixel regions corresponding to a plurality of pixel groups on the display screen; controlling, when displaying the to-be-displayed image on the display screen and according to the virtual display depth information corresponding to each of the plurality of pixel regions, an electric field applied to a liquid crystal lens unit in a light emitting direction of the display screen and corresponding to a pixel group of a pixel region, to change a refractive index of the liquid crystal lens unit; and adjusting, by using the corresponding liquid crystal lens unit, a first virtual image of content displayed by the pixel group.

In addition, the embodiments of this application further provide a non-transitory storage medium, storing a plurality of instructions, the instructions being suitable for being loaded by a processor and performing: obtaining a to-be-displayed image to be displayed on a display screen, the to-be-displayed image comprising a plurality of pixel regions; obtaining, in the to-be-displayed image, virtual display depth information corresponding to each of the pixel regions corresponding to a plurality of pixel groups on the display screen; controlling, when displaying the to-be-displayed image on the display screen and according to the virtual display depth information corresponding to each of the plurality of pixel regions, an electric field applied to a liquid crystal lens unit in a light emitting direction of the display screen and corresponding to a pixel group of a pixel region, to change a refractive index of the liquid crystal lens unit; and adjusting, by using the corresponding liquid crystal lens unit, a first virtual image of content displayed by the pixel group.

BRIEF DESCRIPTION OF THE DRAWINGS

To describe the technical solutions in the embodiments of this application or in the related technology more clearly, the following briefly introduces the accompanying drawings for describing the embodiments or the related technology. Apparently, the accompanying drawings in the following description show merely some embodiments of this application, and a person of ordinary skill in the art may still derive other drawings from the accompanying drawings without creative efforts.

DESCRIPTION OF EMBODIMENTS

Technical solutions in the embodiments of this application are explicitly and completely described below with reference to the accompanying drawings in the embodiments of this application.

Usually, when a person views an object in a real scene, the sight angle of two eyes to the object and a refraction degree of lenses need to be changed in real time according to a difference in the distance and angle between the two eyes and different viewed objects, and the sight angle direction is consistent with the refraction degree of lenses. That is, light field information of the viewed object is captured by human eyes. To achieve viewing experience similar to that in a real scene, a display module, a head mounted display, and an image stereoscopic display method and apparatus provided in the embodiments of this application can enable a user to implement brain-eye coordinated viewing experience in a virtual scene, and can implement superposition with the same visual range between a virtual object and a real object in an Augmented Reality (AR)/Mixed Reality (MR) scene, to improve viewing experience of the user.

Figure 1:
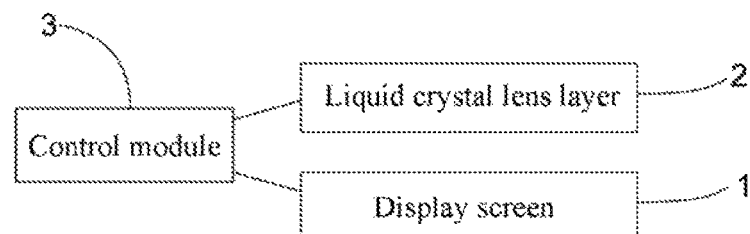
FIG. 1 is a schematic diagram of an electrical connection of a display module according to an embodiment of this application.
Figure 2:
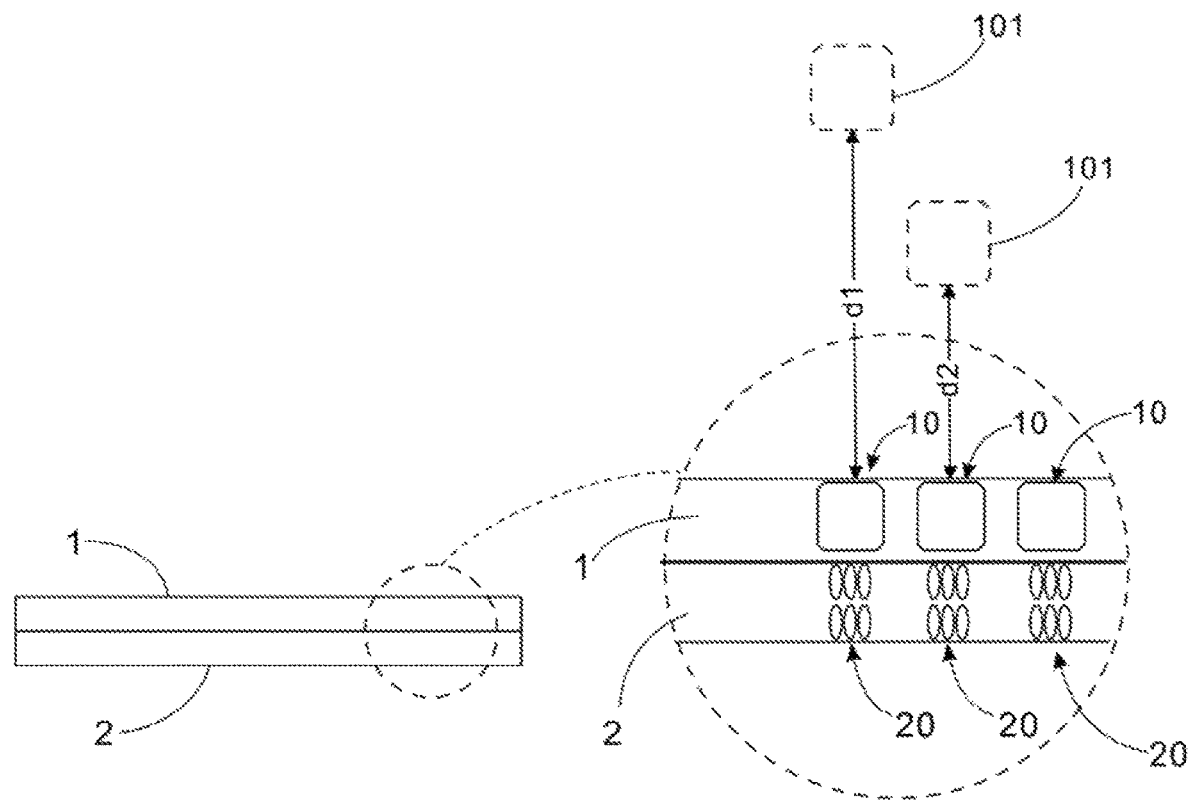
FIG. 2 is a schematic diagram of a structure and optical imaging of a display screen and a liquid crystal lens layer in a display module according to an embodiment of this application.

FIG. 1 is a schematic diagram of an electrical connection of a display module according to an embodiment of this application. FIG. 2 is a schematic diagram of a structure and optical imaging of a display screen and a liquid crystal lens layer in a display module according to an embodiment of this application. As shown in FIG. 1, the display module includes a display screen 1, a liquid crystal lens layer 2, and a control module 3. As shown in FIG. 2, the display screen 1 includes a plurality of pixel group 10, and each pixel group 10 includes at least one pixel. A pixel is a minimum light-emitting unit of a display screen, and each light-emitting unit that is in the display screen and that can be separately controlled is referred to as a pixel. The liquid crystal lens layer 2 may include a plurality of liquid crystal lens units 20, and each pixel group 10 is correspondingly disposed with a liquid crystal lens unit 20. The liquid crystal lens unit 20 includes liquid crystal molecules. As shown in FIG. 1, the control module 3 is electrically coupled to the display screen 1 and the liquid crystal lens layer 2, and configured to obtain virtual display depth information of to-be-displayed content of each pixel group 10 on the display screen 1, and control, according to the virtual display depth information, an electric field of liquid crystal molecules in the liquid crystal lens unit 20 corresponding to the pixel group 10, when or after displaying the to-be-displayed content on the pixel group 10, to change a refractive index of the corresponding liquid crystal lens unit 20, and further, adjust, by using the corresponding liquid crystal lens unit, a first virtual image of the content displayed by the pixel group. The virtual display depth information is distance information of each object in the to-be-displayed content. That is, the control module 3 can control, according to the distance information of each object in the to-be-displayed content included in the content displayed by the pixel group 10, the electric field applied to liquid crystal molecules in a liquid crystal lens unit 20 corresponding to the pixel group 10, to change a refractive index of the liquid crystal lens unit 20, and further, to adjust a virtual image distance of the virtual image corresponding to the content displayed by the pixel group 10.

Figure 3:
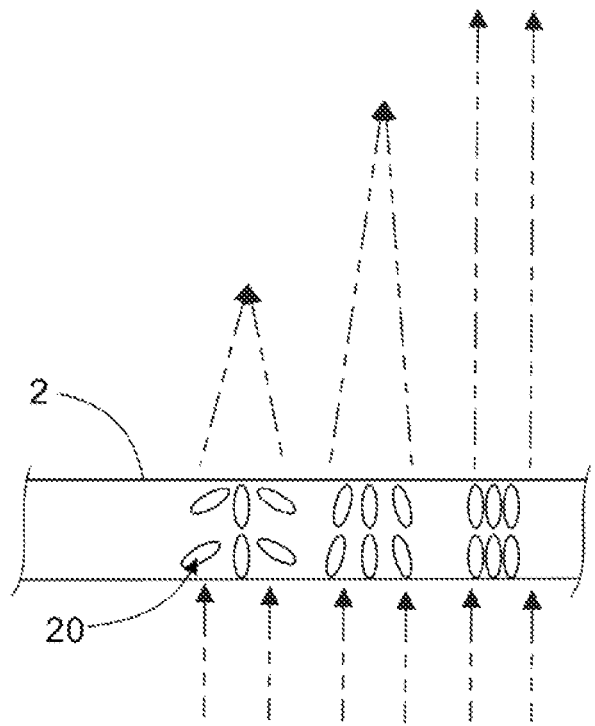
FIG. 3 is a schematic diagram of optical imaging of a liquid crystal lens layer according to an embodiment of this application.
Figure 4:
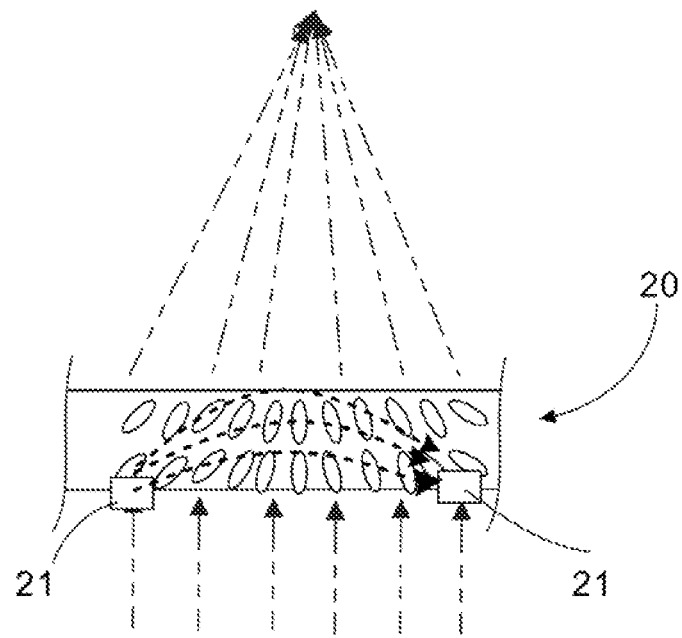
FIG. 4 is a schematic diagram of optical imaging of a liquid crystal lens unit of a liquid crystal lens layer according to an embodiment of this application.

FIG. 3 is a schematic diagram of optical imaging of a liquid crystal lens layer according to an embodiment of this application. FIG. 4 is a schematic diagram of optical imaging of a liquid crystal lens unit of a liquid crystal lens layer according to an embodiment of this application. As shown in FIG. 3 and FIG. 4, in a liquid crystal lens (LC lens) layer 2, when a control module 3 applies different electric fields to each group of liquid crystal lens units 20 by using an electrode 21, liquid crystal molecules in the group of liquid crystal lens units 20 will rotate in different degrees to form different refractive indexes, so that the group of liquid crystal lens units 20 forms micro lenses with different convergence capabilities. Because small electrodes included in the control module 3 generate an electric field to deflect the liquid crystal molecules, to generate a focusing effect, so that a liquid crystal lens unit 20 forms a magnified virtual image of the content displayed by a pixel group 10 corresponding to the liquid crystal lens unit 20. A common lens principle is to use a mirror curvature of the lens to cause light deflection under the same refractive index. For example, the liquid crystal lens layer 2 provided in the embodiments of this application is of an even thickness and can use a refractive index of the liquid crystal lens layer 2 in different regions to cause light deflection.

According to the magnifier principle, when a plane on which an object is located, namely, an object surface, is within one focal length of a lens, a magnified virtual image of the object will be formed on the same side of the object, and a distance between a virtual image and a viewer is a virtual image distance. As shown in FIG. 2, the pixel group 10 of the display screen 1 is located within one focal length of the liquid crystal lens unit 20, and the viewer at the light-emitting side of the display screen 1 can see a first virtual image 101 formed at the same side of the liquid crystal lens unit 20 by content displayed at the pixel group 10.

The control module 3 changes an electric field applied to the liquid crystal lens unit 20, enabling liquid crystal molecules in the liquid crystal lens unit 20 to rotate. The control module 3 applies different electric fields to different liquid crystal lens units 20, liquid crystal molecules in different liquid crystal lens units 20 will rotate in different degree, so that a plurality of liquid crystal lens units 20 can achieve different light refraction effects of the corresponding pixel group 10, and further, a plurality of first virtual images 101 formed by the content displayed by the corresponding pixel group 10 has different virtual image distances.

The content displayed by the plurality of pixel groups 10 is respectively imaged at different virtual image distances by using the liquid crystal lens units 20. As shown in FIG. 2, a distance between the display screen and the viewer is certain (not shown), and the first virtual images 101 that are respectively formed by content displayed by two pixel groups 10 are at d1 and d2 from the display screen. In this way, the viewer can see, through the liquid crystal lens layer 2, that the content displayed by the display screen 1 is in a stereoscopic effect. When the content displayed by each pixel group 10 changes, the control module 3 can control a refractive index change of the corresponding liquid crystal lens unit 20, to further change a virtual image distance of the virtual image of the content displayed by the corresponding pixel group 10, so that the virtual image distance of the virtual image of the content displayed by the pixel group 10 can be changed in real time according to the displayed content, and the viewer can see the corresponding stereoscopic effect in real time, thereby avoiding dizziness and discomfort and improving user experience.

Figure 5:
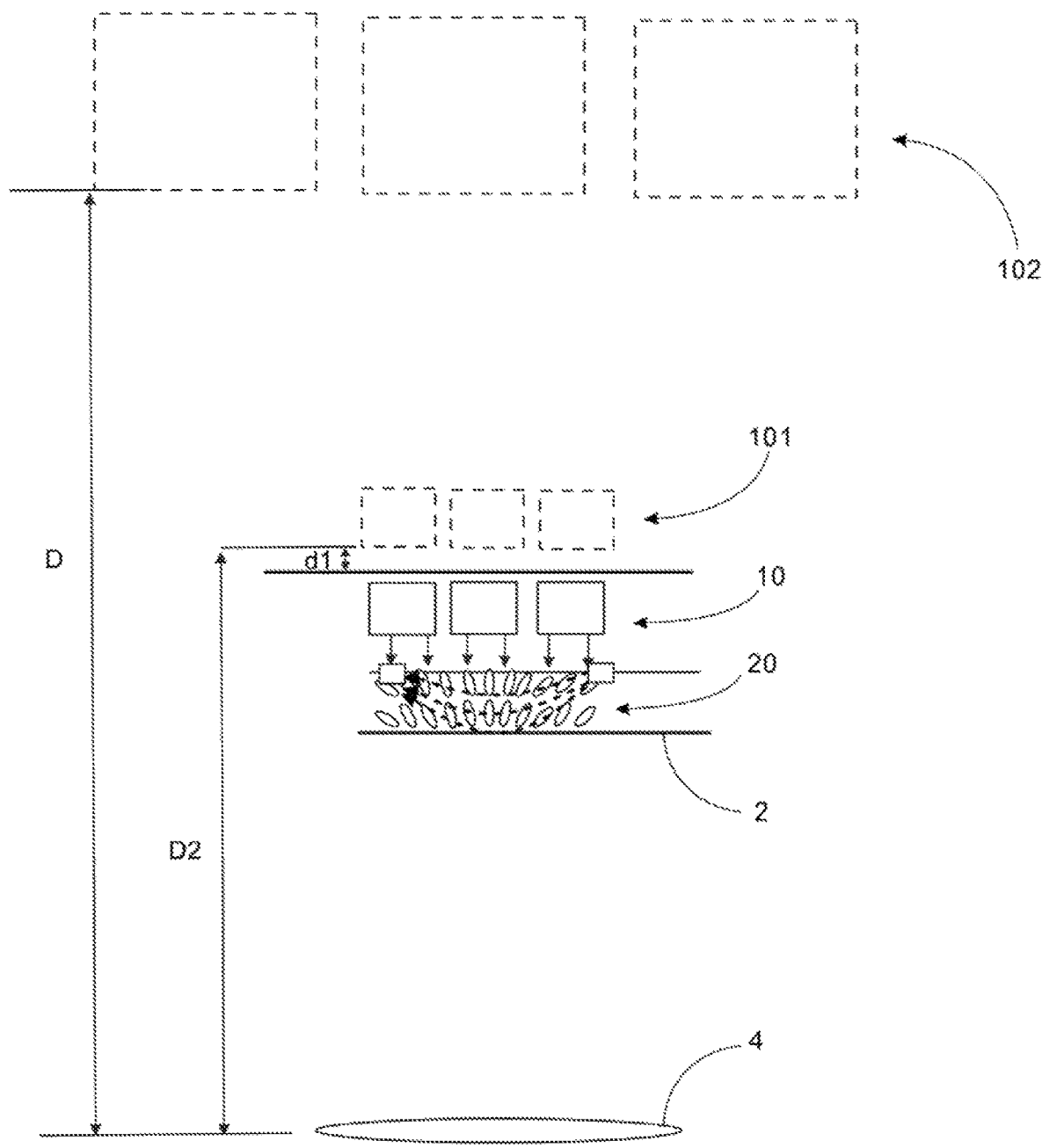
FIG. 5 is a schematic diagram of a structure and optical imaging of a display module according to an embodiment of this application.

FIG. 5 is a schematic diagram of a structure and optical imaging of a display module according to an embodiment of this application. Further, as shown in FIG. 5, a display module may further include a viewing lens 4. A liquid crystal lens layer 2 is located between a display screen 1 and the viewing lens 4, and the viewing lens 4 is located between a user and the liquid crystal lens layer 2. In the embodiments of this application, the viewing lens 4 is a convex lens. The content displayed by the display screen 1 is located within one focal length of the liquid crystal lens layer 2, and a first virtual image 101 of the content displayed by the display screen 1 formed by using the liquid crystal lens layer 2 is located within one focal length of the viewing lens 4, so that viewing lens 4 can magnify the first virtual image 101 to form a magnified second virtual image 102.

Because of the tiny refraction of the liquid crystal lens layer 2, the first virtual image 101 formed by first imaging of the content displayed by the pixel group 10 at the original position is located at a position with a distance d from the display screen 1. The distance d may be very small, that is, in an mm level. By disposing the viewing lens 4, the liquid crystal lens layer 2 and the display screen 1 are both disposed within one focal length of the viewing lens 4 and close to the one focal length, and the first virtual image 101 formed by first imaging through the liquid crystal lens layer 2 can be located within the one focal length of the viewing lens 4 and close to the one focal length. That is, a distance D2 between the first virtual image 101 and the viewing lens 4 is close to the focal length of the viewing lens 4. Therefore, a tiny change of the first virtual image 101 formed by first imaging can cause a second virtual image 102 to change greatly after being formed by second imaging through the viewing lens 4, and a distance D between the second virtual image 102 formed by second imaging and the viewing lens 4 will obviously change with a tiny change of D2. For example, when the focal length of the viewing lens 4 is about 30 mm, 1 mm change of D2 enables the distance D between a second virtual image and the viewing lens to vary by more than 10 m. A position of the second virtual image formed by second imaging through the viewing lens 4 will change obviously, so that when a viewer views a flat display screen 1 through the viewing lens 4, the viewer can see that the content displayed by each pixel group has a different distance, that is, see a stereoscopic image.

The display screen 1 and the liquid crystal lens layer 2 can be closely disposed for ease of assembly and connection, so that the distance between each pixel group 10 and the liquid crystal lens unit 20 is equal, which is conducive to controlling imaging. In an alternative embodiment, no gap would exist between the display screen 1 and the liquid crystal lens layer 2 to prevent dust and other debris from entering between the display screen 1 and the liquid crystal lens layer 2. The display screen 1 and the liquid crystal lens layer 2 are closely disposed, which can minimize the distance between the two, so that when the refractive index of the liquid crystal lens unit 20 changes to a minimum focal length, the pixel group 10 is still located within one focal length of the liquid crystal lens unit 20.

The area of a display region of the display screen 1 may be less than or equal to the area of the liquid crystal lens layer 2, and an edge of the liquid crystal lens layer 2 extends beyond the display area of the display screen 1, so that it can be ensured that each pixel group 10 on the display screen 1 is correspondingly disposed with a liquid crystal lens unit 20. Meanwhile, the area of the liquid crystal lens layer 2 is greater than the area of the display region of the display screen 1, so that an alignment between the liquid crystal lens unit 20 of the liquid crystal lens layer 2 and the pixel group 10 of the display 1 can be facilitated. For example, when a correspondence of the controlled liquid crystal lens unit 20 and the corresponding pixel group 10 is misaligned, the user can move the liquid crystal lens unit 20 to control all liquid crystal lens units 20 to move left and right or up and down. In this case, it can still be ensured that all the pixel groups 10 correspond to the liquid crystal lens unit 20.

When a voltage is applied by an electrode, a plurality of liquid crystal molecules in the liquid crystal lens unit 20 may be arranged in a matrix or in a shape of a plurality of sequentially nested rings.

As shown in FIG. 4, each liquid crystal lens unit 20 may be disposed with two electrodes 21, which are configured to control an electric field. The two electrodes 21 are arranged in the left and right direction of the viewer. The two electrodes 21 are respectively a positive electrode and a negative electrode. The electric field applied to liquid crystal molecules in the liquid crystal lens unit 20 can be changed by changing voltages applied to the two electrodes 21, so that the refractive index of the liquid crystal lens unit 20 can be changed. The two electrodes 21 are arranged in the left and right direction of the viewer to achieve the best visual effect with the left and right eyes of the viewer.

Consistent with the embodiment of this application, the liquid crystal lens layer may also include many pixels. Each liquid crystal lens unit 20 includes at least one pixel. When the electrode applies a voltage to the liquid crystal lens unit 20, the voltage is applied to pixels included in the liquid crystal lens unit 20 to control switches and gray scales of the pixels. Every point that human eyes see on a liquid crystal screen, that is, one pixel, is composed of three sub-pixels of red, green, and blue (RGB). A light source of each sub-pixel can display a different brightness level. The gray scales represent different brightness levels from the darkest to the brightest. More levels indicate that more delicate image effects can be displayed. Red, green, and blue of different brightness levels are combined to form points of different colors.

Consistent with the embodiments of this application, because the control module 3 controls, according to distance information of each object included in content displayed by the pixel group 10, an electric field applied to liquid crystal molecules in the liquid crystal lens unit 20 corresponding to each pixel group 10, to change the refractive index of the liquid crystal lens unit 20, and further adjust the virtual image distance of the virtual image of the content displayed by the corresponding pixel group 10. Therefore, distance information between a camera and an object to be displayed by each pixel group 10 of the display screen 1 in a virtual reality game scene or a virtual reality movie scene may be recorded when a virtual scene is built or generated, for example, when a virtual reality game is designed or a virtual reality movie is shot by a virtual engine Unity. Then, when the user experiences the virtual reality game or the virtual reality movie, the image stereoscopic display apparatus, for example, a head mounted display, obtains the distance between the object and the camera recorded in the virtual reality game or the virtual reality movie, and displays a virtual image of the corresponding object according to the distance.

Consistent with the embodiments of this application, in the virtual reality game, the distance between the object and the camera can be obtained by calculating the distance between the virtual camera and the virtual object in the virtual reality game. In the virtual reality movie, the distance between the object and the camera can be obtained through a camera that can sense the distance when the virtual reality movie is shot.

For example, when a virtual reality game is designed, a first object and a second object exist in the virtual reality game scene. The distances from the first object and the second object to the viewer (that is, the distances from the first object and the second object to the virtual camera in the virtual reality game scene) are respectively a first distance and a second distance. The first distance and the second distance are recorded and stored as distance information with other information (for example, color, brightness, texture and the like) of the objects. The distance information is virtual display depth information. In the virtual reality movie, the distance information may be stored as information of pixels in virtual reality images.

When virtual imaging is performed, for example, when a viewer experiences the virtual reality game by using a head mounted display, and two pixel groups 10 of the display screen 1 in the head mounted display respectively display images of a first object and a second object, the control module 3 obtains virtual display depth information of the first object and the second object from data of the virtual reality game, and respectively applies, according to the virtual display depth information, corresponding electric fields to two liquid crystal lens units 20 corresponding to the two pixel groups, to control refractive indexes of the two liquid crystal lens units 20 corresponding to the two pixel groups, to perform virtual imaging on the images of the first object and the second object according to respective virtual display depth information at a preset ratio, to form two first virtual images 101, and performs virtual imaging again on the two first virtual images 101 through a viewing lens 4 to form two second virtual images 102. Consistent with the embodiments of this application, a correspondence between the refractive index of the liquid crystal lens unit and the voltage can be preset in the control module 3. When virtual imaging is performed, the refractive index of the liquid crystal lens unit 20 is controlled according to the preset correspondence. Virtual image distances of the two second virtual images 102 are respectively equal to the first distance and the second distance, so that the positions of the two second virtual images 102 of the two objects seen by the viewer are the same as the positions of the two objects in the virtual reality game scene. In this way, the viewer can achieve the same experience when freely viewing different sceneries in a real scene, that is, different objects may have different distances.

Figure 6:
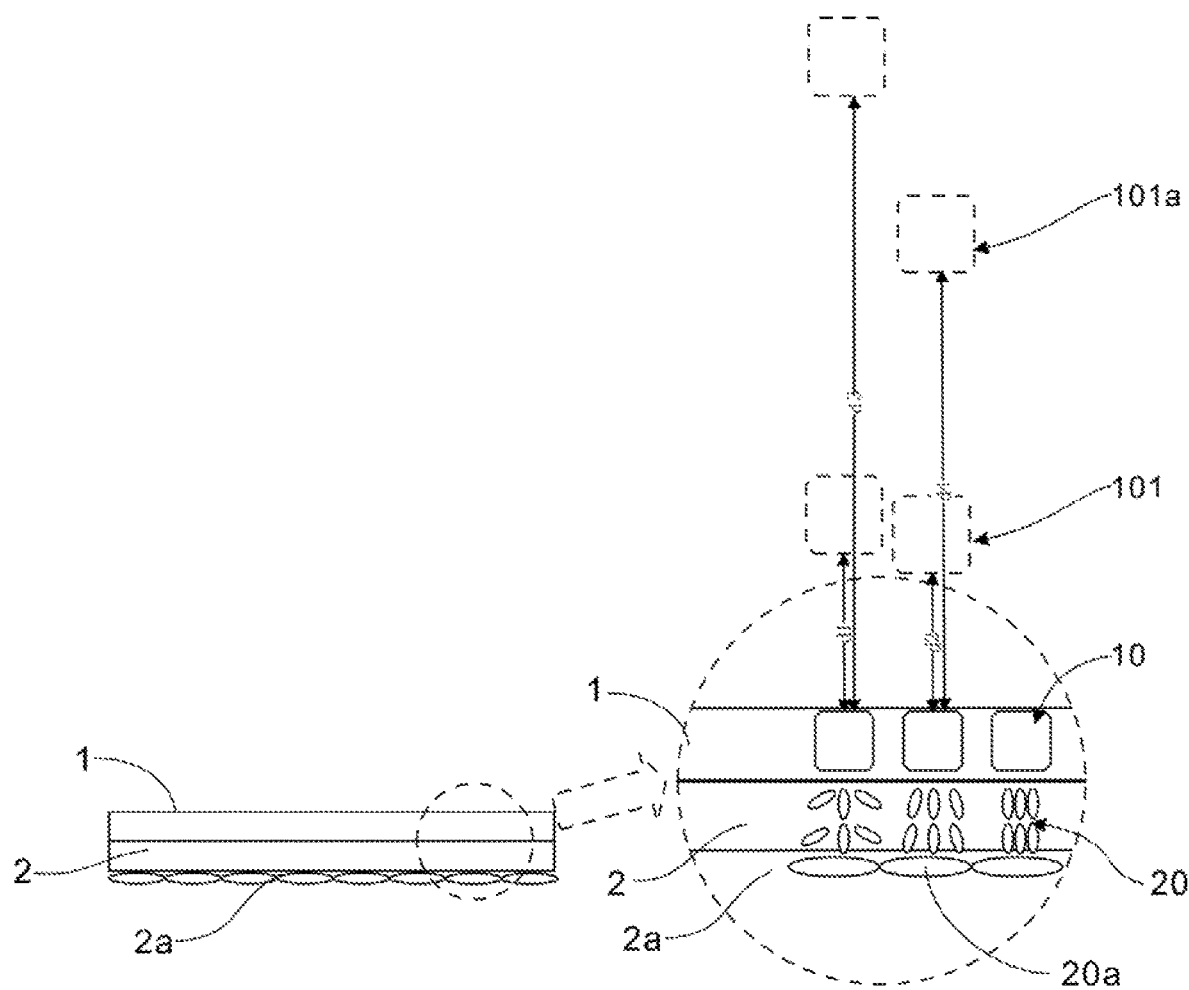
FIG. 6 is a schematic diagram of a structure and imaging of a display module according to an embodiment of this application.

FIG. 6 is a schematic diagram of a structure and imaging of a display module according to an embodiment of this application. In the foregoing embodiments, the second virtual image 102 is formed by second imaging of the first virtual image imaged by the liquid crystal lens layer through viewing lens 4, and the second virtual image 102 is the virtual image that may be seen be the viewer. Consistent with the embodiments of this application, because a response speed and an excitation voltage of the liquid crystal lens layer 2 are related to the thickness thereof, to improve the response speed of the liquid crystal lens layer, and save materials of the liquid crystal lens, as shown in FIG. 6, a lens array layer 2a may be superimposed on the liquid crystal lens layer 2. The lens array layer 2a includes a plurality of convex lens 20a arranged in array, and each convex lens 20a is correspondingly disposed with at least one liquid crystal lens unit. Each convex lens 20a may be correspondingly disposed with the at least one liquid crystal lens unit 20, to re-image the first virtual image 101 of the at least one liquid crystal lens unit 20 to form a transition virtual image 101a. The lens array layer 2a or the formed transition virtual image 101a is located within one focal length of the viewing lens 4, to re-image to form the virtual image finally seen by the viewer. In this way, only a thin liquid crystal lens layer 2 is required to form the first virtual image 101 at positions d1 and d2 from the display screen, and then through an electric field change of the liquid crystal lens unit, the virtual image position of the content displayed by each pixel group in the display screen may be slightly changed. The first virtual image 101 is again formed by using the lens array layer 2a at positions d3 and d4 from the display screen, and the distances d1 and d2 can be further enlarged. Finally, last imaging is performed on the transition virtual image 101a through the viewing lens 4, to form the virtual image that may be finally seen by the viewer. Compared with the virtual image imaged once, the virtual image imaged for three times changes obviously. Therefore, when the user views the flat screen through the viewing lens 4, the user can see that the content displayed by each pixel group has a different distance, that is, see a stereoscopic image.

Further, in the embodiments of this application, the lens array layer is a micro lens array layer, and each convex lens can correspond to one liquid crystal lens unit 20 to improve imaging precision and definition.

The display module provided in the embodiments of this application can be applied to various types of displays or head mounted displays, and can be applied to an AR or MR scene. The viewer's virtual object has the same sight distance as the real object, thereby improving the sense of experience.

Figure 7:
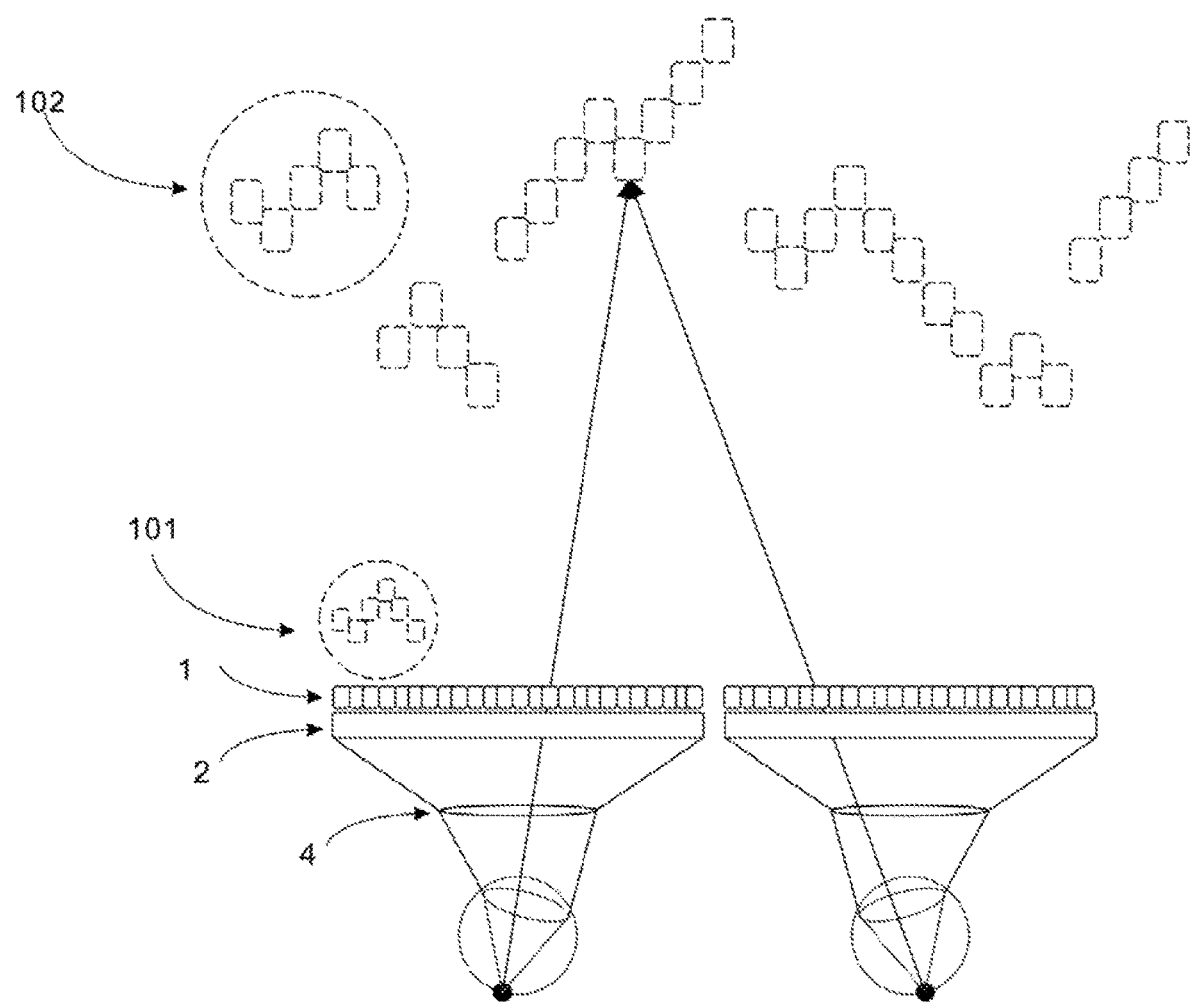
FIG. 7 is a schematic diagram of a structure and optical imaging of a head mounted display according to an embodiment of this application.

FIG. 7 is a schematic diagram of a structure and optical imaging of a head mounted display according to an embodiment of this application. As shown in FIG. 7, the head mounted display may include the display module in the foregoing embodiments, and specifically, may include a display screen 1, a liquid crystal lens layer 2, and a viewing lens 4. A head mounted display may further include a control module 3 (not shown). The control module 3 controls a voltage on the liquid crystal lens unit of the liquid crystal lens layer 2 according to virtual display depth information of content displayed by each pixel group of the display screen 1, to change a refractive index of the corresponding liquid crystal lens unit, and displays a first virtual image 101 of the content displayed by the pixel group on the display screen by using the corresponding liquid crystal lens unit. The first virtual image 101 forms a second virtual image 102 by using the viewing lens 4. For example, the pixels within the dotted circles demonstrate that an exemplary virtual image 101 formed by using the liquid crystal lens layer 2 is enlarged/magnified the viewing lens 4 to form the virtual image 102. The second virtual image 102 may be a portion of the view presented to the user through the head mount (i.e., part of the pixels outside the dotted circle). There may be two display modules, which respectively correspond to the left and right eyes of the viewer. For the components in FIG. 7, reference may be made to the foregoing description.

Figure 8:
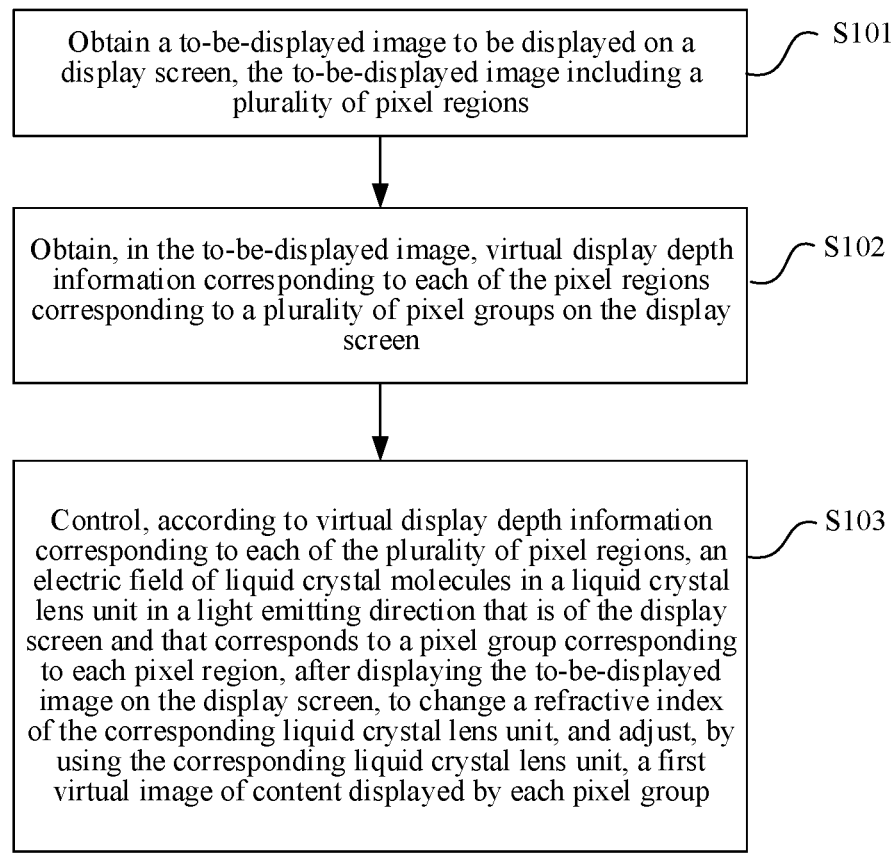
FIG. 8 is a schematic flowchart of an image stereoscopic display method according to an embodiment of this application.

The embodiments of this application further provide an image stereoscopic display method, applicable to the foregoing display module. FIG. 8 shows an image stereoscopic display method provided in the embodiments of this application. As shown in FIG. 8, the method mainly includes the following steps:

Step S101: Obtain a to-be-displayed image to be displayed on a display screen, the to-be-displayed image including a plurality of pixel regions.

Consistent with the embodiments of this application, for example, when an image to be displayed on the display screen is obtained, the display module obtains pixel information included in the to-be-displayed image from to-be-displayed image data; and divides the to-be-displayed image into a plurality of pixel regions according to the pixel information in the to-be-displayed image. The plurality of pixel regions respectively corresponds to a plurality of pixel groups of the display screen, so that each pixel region can be respectively imaged to be located at different virtual image distances from the viewer to display a stereoscopic effect. Pixels on the to-be-displayed image and pixels on the display screen may not be in one-to-one correspondence, and the correspondence between the pixels on the to-be-displayed image and pixels on the display screen may be set according to corresponding precision requirements.

Step S102: Obtain, in the to-be-displayed image, virtual display depth information corresponding to each of the pixel regions corresponding to a plurality of pixel groups on the display screen.

Consistent with the embodiments of this application, the virtual display depth information is distance information between a virtual image in the pixel region and a position of the viewer, that is, distance information simulating the distance between the object and the viewer in the real environment. The virtual display depth information is used for determining the virtual image position of the pixel region, that is, the virtual image distance corresponding to the pixel region. The virtual display depth information may be recorded in data of the to-be-displayed image when the virtual scene is generated or built, so that when the virtual scene is displayed by using the display module, the to-be-displayed image and the virtual display depth information thereof can be obtained.

Consistent with the embodiments of this application, when the virtual scene is generated or built, distance information of an object needs to be recorded to form corresponding virtual display depth information. The distance information of the object may be measured when being shot. For example, a distance measurement device is disposed in a shooting device. During the process of shooting the virtual scene, a distance between an object and the shooting device in each shot image is measured by using the distance measurement device, so that the virtual display depth information corresponding to the object is recorded.

Consistent with the embodiments of this application, the to-be-displayed image includes a left eye display image and a right eye display image, the left eye display image includes a plurality of left eye pixel regions, the right eye display image includes a plurality of right eye pixel regions, and the virtual display depth information is obtained through analysis and calculation according to the corresponding left eye pixel region and right eye pixel region. Usually, the left eye display image and the right eye display image are respectively viewed by the left eye and right eye of the viewer to see a stereoscopic image. The virtual display depth information may be calculated according to a difference between the left eye pixel region and the right eye pixel region corresponding to the left eye display image and the right eye display image at the same position, for example, calculated through binocular vision measurement.

Consistent with the embodiments of this application, when the to-be-displayed image of the display screen is a virtual scene produced by a computer, a position of the content displayed by each pixel group is marked when the virtual scene is produced, so that the distance between the content displayed by each pixel group and the position of the viewer, that is, the virtual display depth information of the pixel region, may be marked.

Step S103: Control, according to virtual display depth information corresponding to each of the plurality of pixel regions, an electric field applied to liquid crystal molecules in a liquid crystal lens unit in a light emitting direction that is of the display screen and that corresponds to a pixel group corresponding to each pixel region, when or after displaying the to-be-displayed image on the display screen, to change a refractive index of the corresponding liquid crystal lens unit, and adjust, by using the corresponding liquid crystal lens unit, a first virtual image of content displayed by each pixel group.

Consistent with the embodiments of this application, the to-be-displayed image is displayed on the display screen 1, the display screen 1 includes a plurality of pixel groups 10, the plurality of pixel groups 10 and a plurality of the pixel regions are in one-to-one correspondence. A light emitting direction of each of the plurality of pixel groups 10 is disposed with a liquid crystal lens unit 20. Each pixel group 10 corresponds to one liquid crystal lens unit 20. All the liquid crystal lens units 20 can form liquid crystal lens layers 2, and are disposed at a light emitting side of the display screen 1. The liquid crystal lens unit 20 can image the pixel region displayed by the corresponding pixel group 10. The pixel region is the content displayed by the corresponding pixel group 10.

According to the virtual display depth information corresponding to each of the plurality of pixel groups, the display module adjusts an electric field applied to liquid crystal molecules in the liquid crystal lens unit 20, to change an refractive index of the liquid crystal lens unit 20, so that each of the plurality of adjusted pixel regions is imaged at a preset ratio at a preset position. The preset position, for example, is the distance d shown in FIG. 5, as the above, and the distance d may be very small and may be within 10 mm.

A side of the liquid crystal lens layer 2 away from the display screen 1 is disposed with a viewing lens 4, the liquid crystal lens layer 2 and the display screen 1 can be located within one focal length of the viewing lens 4, and a virtual image of the content displayed on the display screen 1 for the viewer to view is generated through the viewing lens 4.

In the first implementation of the display module, for example, the method as shown in FIG. 5, a lens array layer 2a is not disposed on the liquid crystal lens layer 2, the viewing lens 4 can image the first virtual image 101 at the preset position at a second preset position, to form a second virtual image 102, and the second preset position is away from the display screen 1 with respect to the preset position.

Through the viewing lens 4, the liquid crystal lens layer 2 and the display screen 1 are both disposed within one focal length of the viewing lens 4 and close to the one focal length, the first virtual image formed by first imaging through the liquid crystal lens layer 2 can be located within the one focal length of the viewing lens 4 and close to the one focal length, so that a position of the second virtual image formed by second imaging will change obviously, so that when a viewer views a flat display screen 1 through the viewing lens 4, the viewer can see that the content displayed by each pixel group has a different distance, that is, see a stereoscopic image.

The second preset position is the same as or approximately the same as the position marked by the corresponding virtual display depth information. When viewing, the user can achieve the same experience when freely viewing different sceneries in a real scene, and achieve viewing experience similar to that in the real scene, so that the user can achieve brain-eye coordinated viewing experience in the virtual scene.

In the second implementation the display module, for example, the method as shown in FIG. 6, the liquid crystal lens layer 2 is disposed with a lens array layer 2a, the lens array layer 2a can perform second imaging on the first virtual image 101 formed by the liquid crystal lens layer 2 to form a transition virtual image 101a, and third imaging may be performed on the transition virtual image 101a through the viewing lens 4 to form a virtual image that is finally seen by the viewer. The virtual image after the third imaging changes obviously, so that when the user views a flat screen through the viewing lens, the user can see that the content displayed by each pixel group has a different distance, that is, see a stereoscopic image.

In the embodiments of this application, the liquid crystal lens layer 2 can cause the pixel region displayed by each pixel group 10 to be imaged for the first time, use a refractive index change of the liquid crystal lens layer 2 to cause a tiny change within 10 mm in the first virtual image of the pixel region displayed by each pixel group 10, and then perform last imaging on the first virtual image through the viewing lens 4 to form a virtual image for the viewer to view. The virtual image distance of the virtual image formed by the viewing lens 4 can magnify the tiny change, so that the finally imaged virtual image distance is approximately the same as an actual shot distance, and viewing experience similar to that in a real scene is achieved.

The content displayed by a plurality of pixel groups in the embodiments of this application is respectively imaged at different virtual image distances through the liquid crystal lens unit. Through the liquid crystal lens layer, the viewer can see that the content displayed by the display screen is in a stereoscopic effect. When the content displayed by the display screen changes, the control module can control the refractive index change of the corresponding liquid crystal lens unit, to further change the virtual image distance of the displayed content, so that the virtual image distance can change in real time according to the change of the displayed content, and the viewer can experience the corresponding stereoscopic effect in real time, thereby avoiding dizziness and discomfort, and improving user experience.

All or some of the processes of the methods in the embodiments may be implemented by a computer program instructing relevant hardware. The program may be stored in a computer readable storage medium. When the program is executed, the processes of the methods in the embodiments are performed. The storage medium may be a magnetic disk, an optical disc, a read-only memory (ROM), a random access memory (RAM), or the like.

Figure 9:
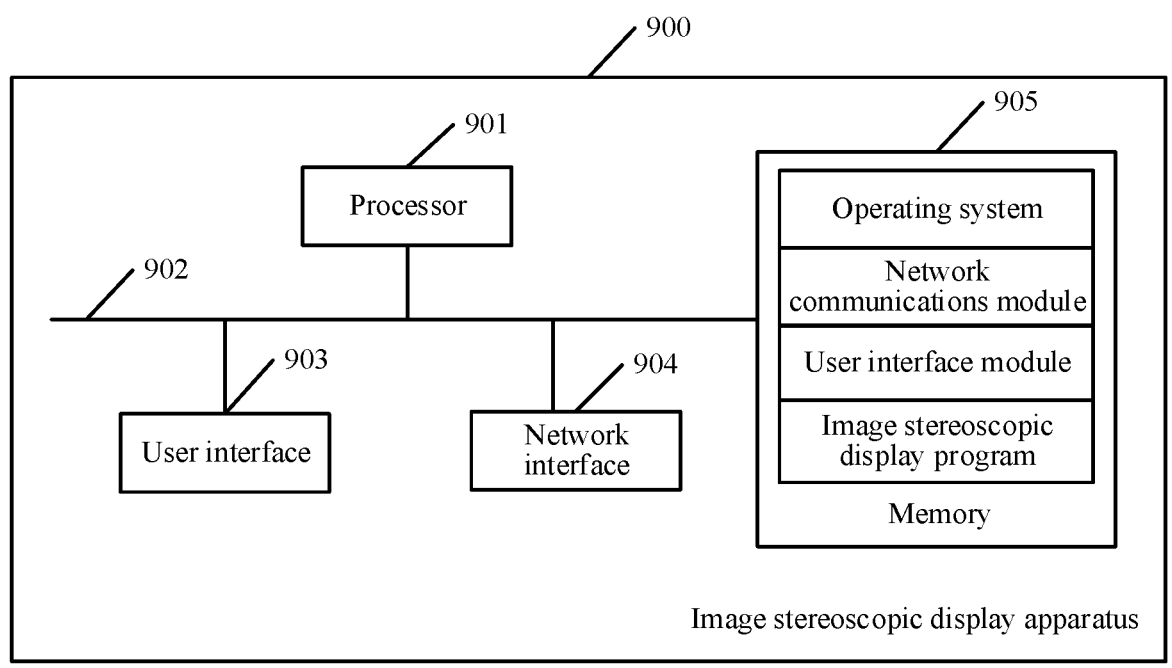
FIG. 9 is a schematic structural diagram of an image stereoscopic display apparatus according to an embodiment of this application.

FIG. 9 is a schematic structural diagram of an image stereoscopic display apparatus according to an embodiment of this application. As shown in FIG. 9, the image stereoscopic display apparatus 900 may include: a processor 901 (for example, CPU), a network interface 904, a user interface 903, a memory 905, and a communications bus 902. The communications bus 902 is configured to implement connection and communication between the components. The memory 905 may be a high-speed RAM memory, or may be a non-transitory memory (non-transitory memory), for example, at least one magnetic disk memory. As shown in FIG. 9, the memory 905, as a computer storage medium, may include an operating system, a network communications module, a user interface module, and an image stereoscopic display program.

The processor 901 may be configured to load the image stereoscopic display program stored in the memory 905, and specifically perform the following operations: obtaining a to-be-displayed image to be displayed on a display screen, the to-be-displayed image including a plurality of pixel regions; obtaining, in the to-be-displayed image, virtual display depth information corresponding to each of the pixel regions corresponding to a plurality of pixel groups on the display screen; controlling, according to virtual display depth information corresponding to each of the plurality of pixel regions, an electric field applied to liquid crystal molecules in a liquid crystal lens unit in a light emitting direction that is of the display screen and that corresponds to a pixel group corresponding to each pixel region, when after displaying the to-be-displayed image on the display screen, to change a refractive index of the corresponding liquid crystal lens unit, and adjust, by using the corresponding liquid crystal lens unit, a first virtual image of content displayed by each pixel group.

The to-be-displayed image includes a left eye display image and a right eye display image, the left eye display image includes a plurality of left eye pixel regions, the right eye display image includes a plurality of right eye pixel regions, and the virtual display depth information is obtained through analysis and calculation according to the corresponding left eye pixel region and right eye pixel region.

The virtual display depth information is measured when the to-be-displayed image is shot; and the virtual display depth information is marked by the to-be-displayed image when a virtual scene is produced.

A side of the liquid crystal lens layer away from the display screen is disposed with a viewing lens, and a second virtual image for the viewer is generated by the viewing lens based on the first virtual image.

What is disclosed above is only the embodiments of this application, and certainly, the scope of this application shall not be limited thereto. A person of ordinary skill in the art can understand all or part of the processes for implementing the foregoing embodiments. Equivalent changes made in accordance with the claims of this application still fall within the scope of this application.

What is claimed is:

1. A display, comprising a display screen, a liquid crystal lens layer, and a control module,
wherein the display screen comprises a plurality of pixel groups, and each pixel group comprising at least one pixel;
wherein the liquid crystal lens layer comprises a plurality of liquid crystal lens units, each pixel group being correspondingly disposed with a liquid crystal lens unit, and the liquid crystal lens unit comprising liquid crystal molecules; and
wherein the control module is electrically coupled to the display screen and the liquid crystal lens layer, and is configured to:
obtain a to-be-displayed image to be displayed on the display screen;
divide the to-be-displayed image into a plurality of pixel regions, each pixel region corresponding to a pixel group of the display screen;
obtain virtual display depth information corresponding to each of the pixel regions, wherein at least two pixel regions in the to-be-displayed image have different virtual display depth information;
control, when displaying the to-be-displayed image and according to the virtual display depth information corresponding to each of the plurality of pixel regions, different electric fields applied to liquid crystal lens units corresponding to the pixel groups of the at least two pixel regions, to change refractive indexes of the corresponding liquid crystal lens units; and
respectively adjust, by using the corresponding liquid crystal lens unit, a first virtual image of content displayed by each of the pixel groups, wherein the at least two pixel regions are respectively imaged to be located at different virtual image distances from a viewer of the display screen.

2. The display of claim 1, wherein the display module further comprises a viewing lens, the liquid crystal lens layer is located between the display screen and the viewing lens, and the viewing lens is configured to generate, according to the first virtual image, a second virtual image.

3. The display of claim 1 wherein a side of the liquid crystal lens layer away from the display screen is disposed with a lens array layer, the lens array layer comprising a plurality of convex lenses arranged in an array, and each convex lens being correspondingly disposed with at least one liquid crystal lens units.

4. The display of claim 3, wherein the lens array layer is a micro lens array layer and each convex lens is correspondingly disposed with one liquid crystal lens unit.

5. The display of claim 1, wherein the display screen is tightly disposed with the liquid crystal lens layer.

6. A head mounted display, comprising a display screen, a liquid crystal lens layer, and a control module,
wherein the display screen comprises a plurality of pixel groups, and each pixel group comprising at least one pixel;
wherein the liquid crystal lens layer comprises a plurality of liquid crystal lens units, each pixel group being correspondingly disposed with a liquid crystal lens unit, and the liquid crystal lens unit comprising liquid crystal molecules; and
wherein the control module is electrically coupled to the display screen and the liquid crystal lens layer, and is configured to:
obtain a to-be-displayed image to be displayed on the display screen;
divide the to-be-displayed image into a plurality of pixel regions, each pixel region corresponding to a pixel group of the display screen;
obtain virtual display depth information corresponding to each of the pixel regions, wherein at least two pixel regions in the to-be-displayed image have different virtual display depth information;
control, when displaying the to-be-displayed image and according to the virtual display depth information corresponding to each of the plurality of pixel regions, different electric fields applied to liquid crystal lens units corresponding to the pixel groups of the at least two pixel regions, to change refractive indexes of the corresponding liquid crystal lens units; and
respectively adjust, by using the corresponding liquid crystal lens unit, a first virtual image of content displayed by each of the pixel groups, wherein the at least two pixel regions are respectively imaged to be located at different virtual image distances from a viewer of the display screen.

7. An image stereoscopic display method, comprising:
obtaining a to-be-displayed image to be displayed on a display screen, the display screen including a plurality of pixel groups;
dividing the to-be-displayed image into a plurality of pixel regions, each pixel region corresponding to a pixel group of the display screen;
obtaining, corresponding to the to-be-displayed image, virtual display depth information corresponding to each of the pixel regions, wherein at least two pixel regions in the to-be-displayed image have different virtual display depth information;
controlling, when displaying the to-be-displayed image on the display screen and according to the virtual display depth information corresponding to each of the plurality of pixel regions, different electric fields applied to liquid crystal lens units in a light emitting direction of the display screen and corresponding to pixel groups of the at least two pixel regions, to change refractive indexes of the liquid crystal lens units; and
respectively adjusting, by using the corresponding liquid crystal lens unit, a first virtual image of content displayed by each of the pixel groups, wherein the at least two pixel regions are respectively imaged to be located at different virtual image distances from a viewer of the display screen.

8. The image stereoscopic display method of claim 7, wherein the to-be-displayed image comprises a left eye display image and a right eye display image, the left eye display image comprises a plurality of left eye pixel regions, the right eye display image comprises a plurality of right eye pixel regions, and the virtual display depth information is obtained according to the corresponding left eye pixel region and right eye pixel region.

9. The image stereoscopic display method of claim 7, wherein
the virtual display depth information is measured when the to-be-displayed image is recorded; or
the virtual display depth information is marked in the to-be-displayed image when a virtual scene is produced.

10. The image stereoscopic display method of claim 7, wherein a side of the liquid crystal lens layer away from the display screen is disposed with a viewing lens, and a second virtual image is generated by using the viewing lens based on the first virtual image.

11. An image stereoscopic display apparatus, comprising: a processor and a memory, the memory storing a computer program, and the computer program being loaded by the processor and performing the following operations:
obtaining a to-be-displayed image to be displayed on a display screen, the display screen including a plurality of pixel groups;
dividing the to-be-displayed image into a plurality of pixel regions, each pixel region corresponding to a pixel group of the display screen;
obtaining, corresponding to the to-be-displayed image, virtual display depth information corresponding to each of the pixel regions, wherein at least two pixel regions in the to-be-displayed image have different virtual display depth information;
controlling, when displaying the to-be-displayed image on the display screen and according to the virtual display depth information corresponding to each of the plurality of pixel regions, different electric fields applied to liquid crystal lens units in a light emitting direction of the display screen and corresponding to pixel groups of the at least two pixel regions, to change refractive indexes of the liquid crystal lens units; and
respectively adjusting, by using the corresponding liquid crystal lens unit, a first virtual image of content displayed by each of the pixel groups, wherein the at least two pixel regions are respectively imaged to be located at different virtual image distances from a viewer of the display screen.

12. The image stereoscopic display apparatus according to claim 11, wherein the to-be-displayed image comprises a left eye display image and a right eye display image, the left eye display image comprises a plurality of left eye pixel regions, the right eye display image comprises a plurality of right eye pixel regions, and the virtual display depth information is obtained through analysis and calculation according to the corresponding left eye pixel region and right eye pixel region.

13. The image stereoscopic display apparatus according to claim 11, wherein
the virtual display depth information is measured when the to-be-displayed image is recorded; or
the virtual display depth information is marked in the to-be-displayed image when a virtual scene is produced.

14. The image stereoscopic display apparatus according to claim 11, wherein a side of the liquid crystal lens layer away from the display screen is disposed with a viewing lens, and a second virtual image is generated by the viewing lens based on the first virtual image.

15. A non-transitory storage medium, storing a plurality of instructions, the instructions being suitable for being loaded by a processor and performing the following operations:
obtaining a to-be-displayed image to be displayed on a display screen, the display screen including a plurality of pixel groups;
dividing the to-be-displayed image into a plurality of pixel regions, each pixel region corresponding to a pixel group of the display screen;
obtaining, corresponding to the to-be-displayed image, virtual display depth information corresponding to each of the pixel regions, wherein at least two pixel regions in the to-be-displayed image have different virtual display depth information;
controlling, when displaying the to-be-displayed image on the display screen and according to the virtual display depth information corresponding to each of the plurality of pixel regions, different electric fields applied to liquid crystal lens units in a light emitting direction of the display screen and corresponding to pixel groups of the at least two pixel regions, to change refractive indexes of the liquid crystal lens units; and
respectively adjusting, by using the corresponding liquid crystal lens unit, a first virtual image of content displayed by each of the pixel groups, wherein the at least two pixel regions are respectively imaged to be located at different virtual image distances from a viewer of the display screen.

16. The non-transitory storage medium of claim 15, wherein the to-be-displayed image comprises a left eye display image and a right eye display image, the left eye display image comprises a plurality of left eye pixel regions, the right eye display image comprises a plurality of right eye pixel regions, and the virtual display depth information is obtained through analysis and calculation according to the corresponding left eye pixel region and right eye pixel region.

17. The non-transitory storage medium of claim 15, wherein the virtual display depth information is measured when the to-be-displayed image is recorded; or
the virtual display depth information is marked in the to-be-displayed image when a virtual scene is produced.

18. The non-transitory storage medium of claim 15, wherein a side of the liquid crystal lens layer away from the display screen is disposed with a viewing lens, and a second virtual image is generated by the viewing lens based on the first virtual image.

19. The non-transitory storage medium of claim 15, wherein a side of the liquid crystal lens layer away from the display screen is disposed with a lens array layer, the lens array layer comprising a plurality of convex lenses arranged in an array, and each convex lens being correspondingly disposed with at least one liquid crystal lens units.

* * * * *